(12) United States Patent
Hofmann et al.

(10) Patent No.: US 9,174,372 B2
(45) Date of Patent: Nov. 3, 2015

(54) SHUT OFF NOZZLE SYSTEM AND METHODS FOR MAKING AND USING THE SAME

(71) Applicant: SABIC Innovative Plastics IP B.V., Bergen op Zoom (NL)

(72) Inventors: Ulrich Hofmann, Gladenbach (DE); Richard Schouwenaar, Kapelle (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 125 days.

(21) Appl. No.: 13/837,855

(22) Filed: Mar. 15, 2013

(65) Prior Publication Data

US 2014/0275443 A1 Sep. 18, 2014

(51) Int. Cl.
| | |
|---|---|
| *B29C 45/00* | (2006.01) |
| *B29C 45/23* | (2006.01) |
| *B29C 45/28* | (2006.01) |
| *B29C 45/56* | (2006.01) |
| *B29C 45/27* | (2006.01) |

(52) U.S. Cl.
CPC ............. *B29C 45/23* (2013.01); *B29C 45/2896* (2013.01); *B29C 45/561* (2013.01); *B29C 2045/2714* (2013.01); *B29C 2045/5625* (2013.01)

(58) Field of Classification Search
CPC ............... B29C 2045/5625; B29C 45/2896; B29C 45/23; B29C 2045/2714; B29C 45/561
See application file for complete search history.

(56) References Cited

U.S. PATENT DOCUMENTS

| 6,641,770 B2 | 11/2003 | Schieberl |
|---|---|---|
| 2004/0151799 A1 | 8/2004 | Gellert et al. |
| 2009/0220636 A1 | 9/2009 | Gunther |

FOREIGN PATENT DOCUMENTS

| CA | 2455514 A1 | | 7/2005 |
|---|---|---|---|
| CN | 201102294 Y | | 8/2008 |
| EP | 0447573 A1 | | 9/1991 |
| FR | 1050097 A | | 1/1954 |
| JP | 57-70626 | * | 5/1982 |
| JP | 57-72831 | * | 5/1982 |
| JP | S57070626 A | | 5/1982 |
| JP | S57072831 A | | 5/1982 |
| JP | H02188218 A | | 7/1990 |
| JP | H0322142 A | | 9/1991 |
| JP | H06328535 A | | 11/1994 |
| JP | H08323813 A | | 12/1996 |
| JP | H09262881 A | | 10/1997 |
| JP | H11277573 A | | 10/1999 |
| JP | 2000062059 A | | 2/2000 |
| WO | 2011123271 A1 | | 10/2011 |

OTHER PUBLICATIONS

International Search Report; International Application No. PCT/IB0214/059396; International Filing Date: Jun. 10, 2014; Date of Mailing: Mar. 3, 2014; 5 Pages.

(Continued)

*Primary Examiner* — Jill Heitbrink
(74) *Attorney, Agent, or Firm* — Cantor Colburn LLP (57) ABSTRACT

In one embodiment, a tool, comprising: a tool stationary portion comprising a nozzle and a film gate; and a tool movable portion comprising a shut off pin opposite the nozzle and the film gate; wherein the shut off pin prevents polymer melt in the nozzle from leaking into a cavity of the tool after injection of polymer into the tool.

15 Claims, 4 Drawing Sheets

(56) References Cited

OTHER PUBLICATIONS

Machine Translation of FR1050097 (A); Date of Publication Jan. 5, 1954; 13 Pages.
Written Opinion of the International Searching Authority; International Application No. PCT/IB0214/059396; International Filing Date: Jun. 10, 2014; Date of Mailing: Mar. 3, 2014; 5 pages.
European Patent No. 0447573 (A1); Publication Date: Sep. 25, 1991; Abstract Only; 2 Pages.
Chinese Patent No. 201102294 (Y); Publication Date: Aug. 20, 2008; Machine Translation; 5 Pages.
International Preliminary Report on Patentability; International Application No. PCT/IB2014/05396; International Filing Date: Mar. 3, 2014; Date of Mailing: Oct. 7, 2015; 18 Pages.
Secondary Written Opinion; International Application No. PCT/IB2014/059396; International Filing Date: Mar. 3, 2014; Date of Received: Sep. 24, 2015; 9 Pages.

* cited by examiner

SHUT OFF NOZZLE SYSTEM AND METHODS FOR MAKING AND USING THE SAME

TECHNICAL FIELD

Disclosed herein is a shut off nozzle system separate from the nozzle of the runner in an injection mold and methods for making and using the same.

BACKGROUND

For the production of single-component molded plastic parts, injection molding and compression processes (injection compression molding) can be used. Typical injection molding processes without a compression technique are used for the production of relatively small injection molded parts, in the case of which short flow paths occur and it is possible to work with moderate injection pressures. In an injection molding process, generally, a polymer melt is injected into a cavity formed between two closed, positionally fixed mold plates and solidifies there.

Injection compression molding processes differ from typical injection molding processes in that the injecting and/or solidifying operation is carried out while performing a mold plate movement. The polymer melt is compressed while performing mold movement in the closing direction. In particular, in the production of large-area and thin walled molded parts, the compression technique can be suitable, since in this way, a lowering of the high injection pressures required in the case of large molded parts can be achieved. Furthermore, stresses or warpage in the injection molded part, which generally occur as a result of high injection pressures, can be avoided.

The film gate process can be used to avoid sprue marks on sheet or shaped plastic parts. For optical parts, sprue marks cannot be tolerated. For the film gate technique, the injection molding of the shaped part takes place laterally by means of a film plate. The film plate has a runner, which opens into the component cavity at the edge. After the material has cooled down and the shaped part has been removed from the injection mold, it is provided with the film sprue, of a form corresponding to the runner in the film plate. After removal, the film sprue must be detached from the shaped part. On account of the lateral or edge side injection molding performed in the film-gate technique, no sprue marks occur on the main surfaces of the shaped part. However, an additional working step is required for sprue detachment, which can cause loss of material, soiling of the shaped part, and optical defects at the point of detachment can be an issue.

Injection compression molded glazing parts often require maximum optical clarity. Therefore, during injection molding, the lowest possible stress levels should be reached. Injection compression molding further requires no backflow of the material from cavity to the runner, which can result in undesirably high shrinkage in the gate region of the shaped part. In a typical shut off nozzle system, the shut off pin has an influence on the stress and the optical quality of the part produced. Thus, there is a need for a system that can prevent backflow of the material into the runner alternatively, or in combination with a free flowing nozzle without a pin in the flow of the material.

SUMMARY

Disclosed, in various embodiments, is a shut off nozzle system separate from the nozzle of the runner in an injection mold and methods for making and using the same.

In one embodiment, a tool, comprising: a tool stationary portion comprising a nozzle and a film gate; and a tool movable portion comprising a shut off pin opposite the nozzle and the film gate; wherein the shut off pin prevents polymer melt in the nozzle from leaking into a cavity of the tool after injection of polymer into the tool.

In another embodiment a tool comprises: a tool stationary portion comprising a nozzle through which polymer melt flows laminarly; and a tool movable portion comprising a shut off pin; wherein the tool stationary portion and the tool movable portion form a cavity therein when the tool is closed; wherein the shut off pin is configured to seal the polymer melt in the nozzle after injection of polymer melt into the cavity.

In one embodiment, a method of making a shaped part, comprises: closing a tool comprising a tool stationary portion comprising a nozzle and a film gate and a tool movable portion comprising a shut off pin opposite the nozzle and the film gate; injecting polymer melt into a cavity of the tool, wherein the polymer melt flows through the nozzle; sealing the nozzle by moving the shut off pin in the direction of the nozzle; completing a compression stroke; releasing the shut off pin; pushing the shut off pin in the opposite direction of the nozzle; opening the tool; ejecting the shaped part; and pulling leftover material from the nozzle with the shut off pin.

These and other features and characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Disclosed herein is a shut off system for an injection mold that can effectively prevent the backflow of material into the runner system, wherein a shut off pin in the shut off system is not located in the nozzle of the runner (e.g., hot runner). As disclosed herein, the shut off pin can be located opposite the gate region in the injection mold, and can prevent backflow of material into the runner system of the injection mold. In other words, the nozzle is located in one mold section (e.g., mold half) and the shut off system is located in another mold section (e.g., the other mold half). Locating the shut off pin opposite the gating in an injection mold can solve the problems associated with undesirably high shrinkage in the gate region of the shaped part. Generally in a shut off nozzle system, the shut off pin has an influence on the stress and the optical quality of the part produced. Thus, there is a need for a system that can prevent backflow of the material into the runner, alternatively or in combination with a free flowing nozzle without a pin in the flow of the material. The shut off system disclosed herein wherein the shut off pin is located opposite the gate region, can prevent backflow of material into the runner system of the injection mold.

An injection mold generally has at least two parts which are clamped on the injection mold machine wherein different molds are used for different molding geometries. Each mold contains a cavity, into which polymers can be injected and which after the molding cycle has completed, forms the final part geometry. An injection molding cycle generally comprises several steps including the start of plastication where the screw rotates and transports melt to the screw chamber in front of the screw tip. The screw returns, sliding axially. At the end of plastication, screw rotation is switched off. In the screw chamber, enough material is left to make the molding. The mold is then closed and the clamping unit moves forward until the mold halves are in close contact. Injection is started and the screw moves forward axially without rotation and transports the melt into the cavity. Next, injection is finished and the mold is cooled wherein during this step, the mold is volumetrically filled with hot melt. As the molded part cools from the melt temperature, further melt is conveyed into the cavity to compensate for volume contraction where subsequently the injection unit starts plasticating and preparing material for the next shot. In the final step, after the molded part is sufficiently cooled, the mold opens and the finished molded part is ejected. The plasticating procedure is finished and the production of the next mold can begin.

During injection compression molding, polymer is introduced into a slightly opened mold with simultaneous or subsequent compression by an additional clamping stroke. The additional clamping stroke can be accomplished via a machine or a compression punch in the mold. In injection compression molding, the pressure build-up in the mold can be distributed in two dimensions more uniformly over the molded part. For example, accurate reproduction of surface detail and the dimensional stability of the components can be achieved. Injection compression molding is generally a low pressure process, which can, for example, protect decorative trim and/or metal inserts. Low pressure injection molding processes can be desirable to minimize internal stresses resulting in optical clarity of the molded part.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 1:
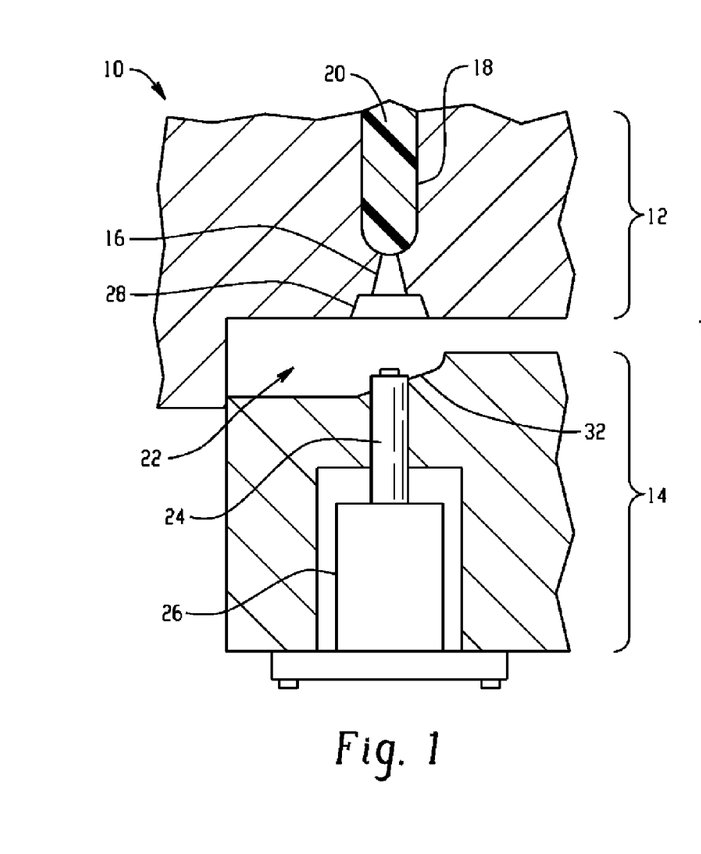
FIG. 1 is a sectional, schematic view of a shut off pin in an injection mold as a tool is closed.
Figure 2:
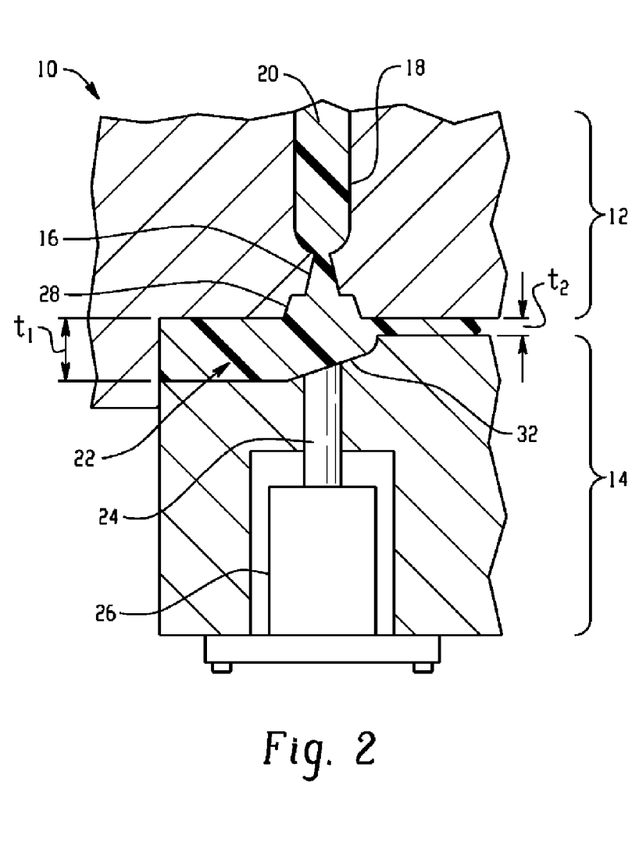
FIG. 2 is a sectional, schematic view of the shut off pin of FIG. 1 after injection.
Figure 3:
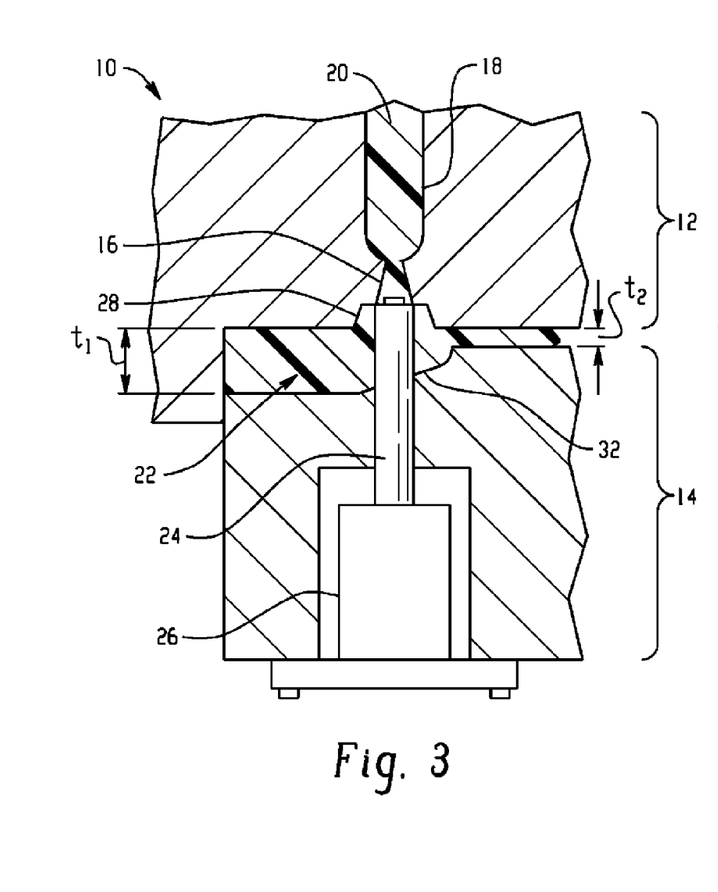
FIG. 3 is a sectional, schematic view of the shut off pin of FIG. 1 where the shut off pin closes the nozzle.
Figure 4:
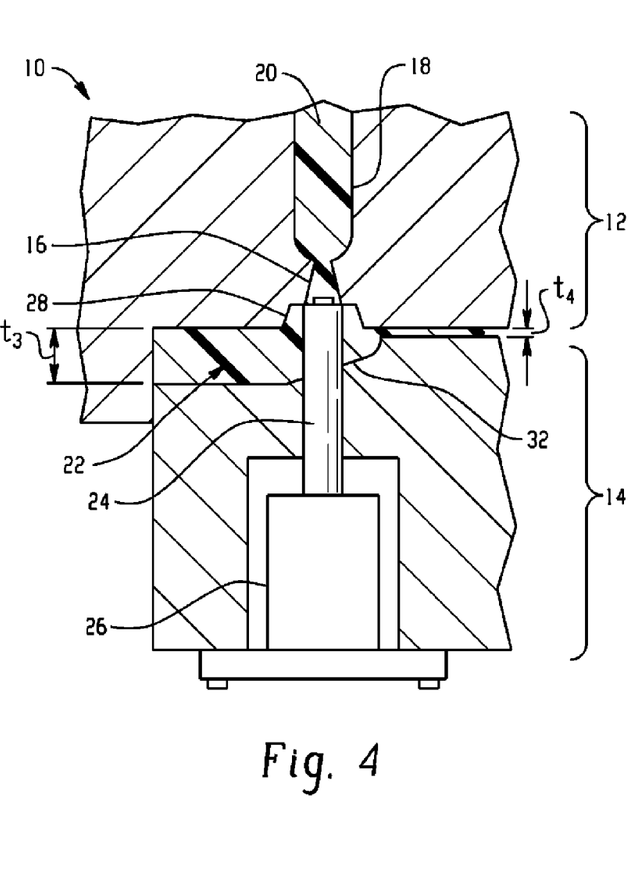
FIG. 4 is a sectional, schematic view of the shut off pin of FIG. 1 when the tool is in compression.

FIGS. 1 to 5 illustrate various views of a partial injection mold with a shut off pin 24 separate from a nozzle 16. In FIG. 1, a tool 10 can have a tool first portion (e.g., tool stationary portion) 12 (i.e., core) and a tool second portion (e.g. tool movable portion) 14 (i.e., cavity) with the nozzle 16 located in the tool first portion 12. A sprue bushing 18 can also be located in the tool first portion 12 adjacent to the nozzle 16. In FIG. 1, polymer melt 20 can flow into the sprue bushing 18, while in FIG. 2, the polymer melt 20 can be seen flowing from the sprue bushing 18 into the nozzle 16 and film gate 22. In FIG. 1, the tool 10 is closed, while FIG. 2 illustrates the tool 10 after injection of the polymer melt 20. FIG. 3 illustrates a shut off pin 24 closing the nozzle 16, and FIG. 4 illustrates compression where a thickness, $t_3$, of the film gate 22 and the part thickness $t_4$ is reduced compared to before compression (see $t_1$ or $t_2$ in FIG. 2 or 3). The shut off pin 24 can move as result of hydraulic pressure release inside the tool 10. Since the shut off pin can be moved by the tool movement, the hydraulic system can have an overflow unit. Pressures used in the injection molding system can reach, for example, up to 170 bars. If the tool is pressing the shut off nozzle pin backwards the hydraulic oil in the return flow of the cylinder goes via a restriction valve to the tank.

Figure 5:
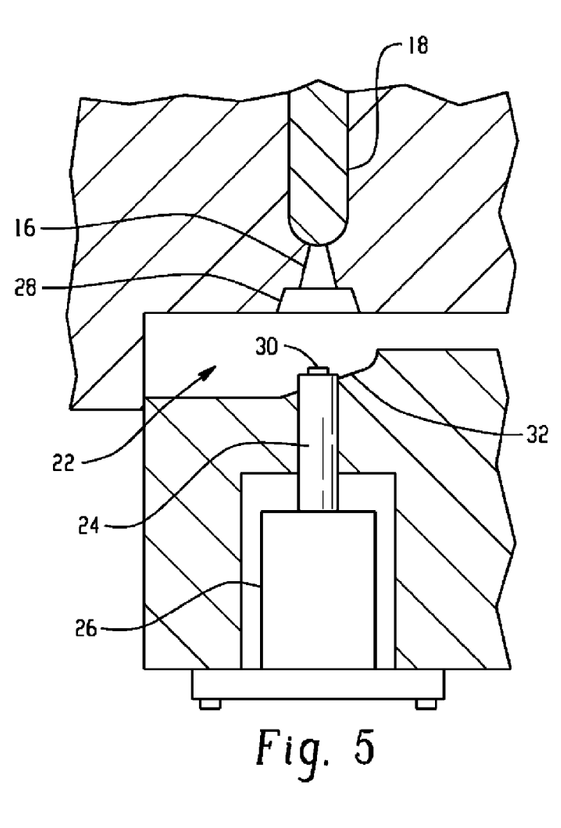
FIG. 5 is a sectional, schematic view of the shut off pin of FIG. 1, illustrating the shut off pin in greater detail.
Figure 8:
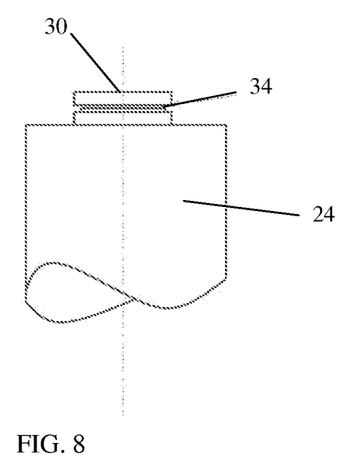
FIG. 8 is a partial cutaway view of the shut off pin of FIG. 1.

The shut off pin 24 is illustrated in more detail in FIGS. 5 and 8. As can be seen in FIG. 5, the shut off pin 24 can comprise a ledge 30 protruding from an end of the shut off pin 24 closest to an annular section 28 of the nozzle 16. The ledge 30 can have an undercut 34 that can be used, for example, to pull a cold slug of unformed polymer out of the nozzle 16 after molding is complete and the tool 10 opens to remove a shaped part. The cold slug can result from polymer melt flow in the hot runner being split by the shut off pin 24 so that polymer melt dispersed around the shut off pin 24 is relatively cold. Generally, such a design gives a stress line in clear parts, e.g., clear glazing parts, that can be visible under polarized light. Such a design can also result in turbulent flow around the nozzle 16 and behind a shut off pin that is located in the nozzle. However, with the design disclosed herein wherein the shut off pin 24 is located opposite the film gate 22, the stress line can be reduced or eliminated. Without wishing to be limited by theory, it is believed that locating the shut off pin 24 opposite the film gate 22 can result in laminar flow of the polymer melt, which can reduce the occurrence and/or appearance of stress lines in a clear shaped part. It is believed that eliminating the shut off pin from the nozzle side of the tool can reduce the amount of disturbances that the polymer melt has to flow around, meaning that laminar flow can be maintained or reached more quickly with the design disclosed herein wherein the shut off pin 24 is located opposite the film gate 22 and the nozzle 16.

It can be desirable for the shut off pin 24 to be taperless to ensure clearing for tool movement due to clamping or heat differences between the two tool halves. To ensure correct tearing of the film gate 22, the annular section 28 can be matched to the cooling down behavior of the film gate, which generally becomes cold after forming of the shaped part. A sloped section 32 on a portion of the film gate 22 can help ensure that the cold slug moves opposite the part direction in the cold runner. If the cold slug moves in the part direction it can form splay in the part, rendering the part scrap.

A method of making a shaped part using the system disclosed herein can comprise closing the tool by creating relative motion between the first portion and the second portion of the mold (in other words, either or both mold portions can move to close the tool), injecting polymer melt into a cavity, blocking the nozzle with the shut off pin (e.g., moving the shut off pin forward to seal the nozzle and/or sprue bushing), compressing the polymer melt in the cavity, releasing the shut off pin. During opening of the tool, the shut off pin can push the solidified film gate on the cavity side, e.g., functioning like an ejector pin.

The tool disclosed herein comprising a shut off pin opposite a film gate in separate portions of the tool. This tool can be used to form various articles including, but not limited to, glazing (e.g., rooflite, rear window, side window, windshield in automotive applications), appliques (e.g., automotive appliques), headlamps (e.g., headlamp lenses), outdoor applications including, but not limited to, building and construction (e.g., buildings, stadiums, greenhouses, etc.).

Possible polymers which can be molded with the tool disclosed herein include, but are not limited to, oligomers, polymers, ionomers, dendrimers, copolymers such as graft copolymers, block copolymers (e.g., star block copolymers, random copolymers, etc.) and combinations comprising at least one of the foregoing. Examples of such polymers include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (e.g., polyetherimides), acrylonitrile-butadiene-styrene (ABS), polyalkylmethacrylates (e.g., polymethylmethacrylates (PMMA)), polyesters (e.g., copolyesters, polythioesters), polyolefins (e.g., polypropylenes (PP) and polyethylenes, high density polyethylenes (HDPE), low density polyethylenes (LDPE), linear low density polyethylenes (LLDPE)), polyamides (e.g., polyamideimides), polyarylates, polysulfones (e.g., polyarylsulfones, polysulfonamides), polyphenylene sulfides, polytetrafluoroethylenes, polyethers (e.g., polyether ketones (PEK), polyether ether ketones (PEEK), polyethersulfones (PES)), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazzanes, polysiloxanes, fluoropolymers (e.g., polyvinyl fluoride (PVF), polyvinylidene fluoride (PVDF), fluorinated ethylene-propylene (FEP), polyethylenetetrafluoroethylene (ETFE)) and combinations comprising at least one of the foregoing.

More particularly, the polymers can include, but are not limited to, polycarbonate resins (e.g., LEXAN™ resins, commercially available from SABIC'S Innovative Plastics Business), polyphenylene ether-polystyrene resins (e.g., NORYL™ resins, commercially available from SABIC'S Innovative Plastics Business), polyetherimide resins (e.g., ULTEM™ resins, commercially available from SABIC'S Innovative Plastics Business), polybutylene terephthalate-polycarbonate resins (e.g., XENOY™ resins, commercially available from SABIC'S Innovative Plastics Business), copolyestercarbonate resins (e.g. LEXAN™ SLX resins, commercially available from SABIC'S Innovative Plastics Business) polycarbonate/acrylonitrile butadiene styrene resin (e.g., CYCOLOY™, commercially available from SABIC'S Innovative Plastics Business), and combinations comprising at least one of the foregoing resins. Even more particularly, the polymers can include, but are not limited to, homopolymers and copolymers of a polycarbonate, a polyester, a polyacrylate, a polyamide, a polyetherimide, a polyphenylene ether, or a combination comprising at least one of the foregoing resins. The polycarbonate can comprise copolymers of polycarbonate (e.g., polycarbonate-polysiloxane, such as polycarbonate-polysiloxane block copolymer), linear polycarbonate, branched polycarbonate, end-capped polycarbonate (e.g., nitrile end-capped polycarbonate), and combinations comprising at least one of the foregoing, for example, a combination of branched and linear polycarbonate.

The polymers can optionally include various additives ordinarily incorporated into polymer compositions of this type, with the proviso that the additive(s) are selected so as to not significantly adversely affect the desired properties of the polymer, for example, transparency. Such additives can be mixed at a suitable time during the mixing of the components for forming articles made from the polymers. Exemplary additives include impact modifiers, fillers, reinforcing agents, antioxidants, heat stabilizers, light stabilizers, ultraviolet (UV) light stabilizers (e.g., UV absorbing), plasticizers, lubricants, mold release agents, antistatic agents, colorants (such as carbon black and organic dyes), surface effect additives, infrared radiation stabilizers (e.g., infrared absorbing), flame retardants, thermal conductivity enhancers, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.001 wt. % to 30 wt. %, based on the total weight of the composition. In one embodiment, optionally, fibers (e.g., carbon, ceramic, or metal) can be incorporated into the polymer to enhance thermal conductivity, subject to compatibility with optical and/or aesthetic requirements.

Figure 6:
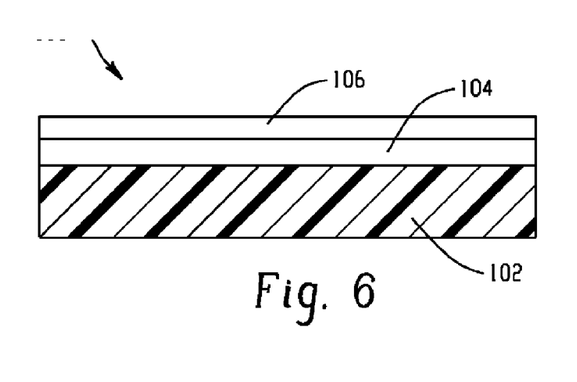
FIG. 6 is a view of a glazing.
Figure 7:
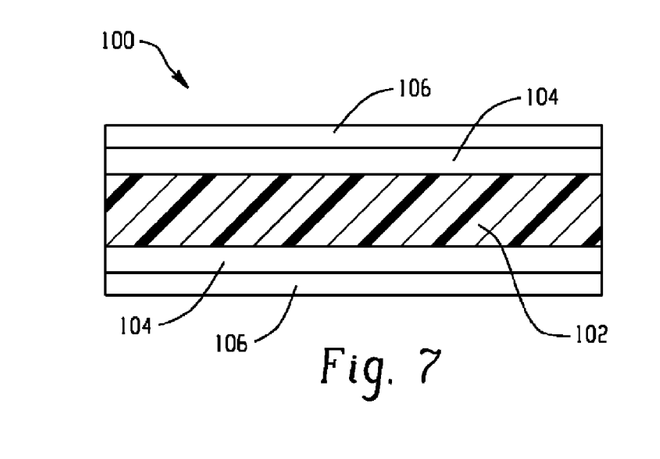
FIG. 7 is a view of another glazing.

As illustrated in FIGS. 6 and 7, a glazing 100 can generally comprise a substrate 102, a weathering layer 104 disposed on either or both sides of the substrate 102, e.g., for protection against ultraviolet radiation, and an abrasion resistant layer 106 disposed on either or both sides of the substrate 102, e.g., to protect the substrate 102 from scratches or debris related damage. When the weathering layer 104 and abrasion resistant layer 106 are both present, the weathering layer 104 can be located between the substrate 102 and the abrasion resistant layer 106. The substrate 102 can be transparent or opaque. A glazing 100 comprising a transparent substrate 102 can further comprise an optional integrated dark border (blackout border), e.g., the second shot in a two-shot injection molding process.

The substrate can comprise any of the polymers set forth above. For example, the substrate can comprise a transparent polymer such as polycarbonate resin, acrylic polymers, polyacrylate, polyester, polysulfone resins, as well as combinations comprising at least one of the foregoing. In some embodiments the substrate can comprise an opaque polymer allowing less than or equal to 1% of visible light to transfer through the substrate (e.g., automotive appliques, automotive body panel applications, etc.), while in other embodiments, the substrate can comprise a transparent polymer allowing greater than or equal to 5% of visible light to transfer through it (e.g., front windshield, driver's side window, rooflite, all other vehicle windows, etc.). Visible light transmittance can be determined in accordance with the American Society for Testing Materials (ASTM) standard D1003-11, Procedure A using Commission Internationale de L'Eclairage (CIE) standard illuminant C (see e.g., International Standards Organization (ISO) 10526). The polycarbonate resins can be aromatic carbonate polymers which may be prepared by reacting dihydric phenol(s) with a carbonate precursor such as phosgene, a haloformate, or a carbonate ester. One example of a polycarbonate which can be used is polycarbonate LEXAN™, commercially available from SABIC'S Innovative Plastics Business. The polymer substrate can include bisphenol-A polycarbonate and other resin grades (such as branched or substituted) as well as being copolymerized or blended with other polymers such as polybutylene terephthalate (PBT), poly-(acrylonitrile-butadiene-styrene) (ABS), or polyethylene.

Acrylic polymers can be prepared from monomers such as methyl acrylate, acrylic acid, methacrylic acid, methyl methacrylate, butyl methacrylate, cyclohexyl methacrylate, and the like, as well as combinations comprising at least one of the foregoing. Substituted acrylates and methacrylates, such as hydroxyethyl acrylate, hydroxybutyl acrylate, 2-ethylhexylacrylate, and n-butylacrylate can also be used.

Polyesters can be prepared, for example by the polyesterification of organic polycarboxylic acids (e.g., phthalic acid, hexahydrophthalic acid, adipic acid, maleic acid, terephthalic acid, isophthalic acid, sebacic acid, dodecanedioic acid, and so forth) or their anhydrides with organic polyols containing primary or secondary hydroxyl groups (e.g., ethylene glycol, butylene glycol, neopentyl glycol, and cyclohexanedimethanol).

Polyurethanes are another class of materials which can be used to form the substrate. Polyurethanes can be prepared by the reaction of a polyisocyanate, with a polyol, polyamine, or water. Examples of polyisocyanates include hexamethylene diisocyanate, toluene diisocyanate, diphenylmethane diisocyanate (MDI), isophorone diisocyanate, and biurets and thisocyanurates of these diisocyanates. Examples of polyols include low molecular weight aliphatic polyols, polyester polyols, polyether polyols, fatty alcohols, and the like.

Examples of other materials from which the substrate can be formed include CYCOLAC™ (acrylonitrile-butadiene-styrene, commercially available from SABIC'S Innovative Plastics Business), CYCOLOY™ (a blend of LEXAN™ and CYCOLAC™, commercially available from SABIC'S Innovative Plastics Business), VALOX™ (polybutylene terephthalate, commercially available from SABIC'S Innovative Plastics Business), XENOY™ (a blend of LEXAN™ and VALOX™, commercially available from SABIC'S Innovative Plastics Business), and the like.

The polymer substrate can further comprise various additives, such as impact modifiers, fillers, reinforcing agents, antioxidants, heat stabilizers, light stabilizers, ultraviolet (UV) light stabilizers (e.g., UV absorbing), plasticizers, lubricants, mold release agents, antistatic agents, colorants (such as carbon black and organic dyes), surface effect additives, infrared radiation stabilizers (e.g., infrared absorbing), flame retardants, thermal conductivity enhancers, and anti-drip agents.

The substrate can be formed, for example, in the injection compression process disclosed herein.

A weathering layer can be applied to the substrate. For example, the weathering layer can be a coating having a thickness of less than or equal to 100 micrometers (μm), specifically, 4 μm to 65 μm. The weathering layer can be applied by various means, including dipping the substrate in a coating solution at room temperature and atmospheric pressure (i.e., dip coating). The weathering layer can also be applied by other methods including, but not limited to, flow coating, curtain coating, and spray coating. The weathering layer can comprise silicones (e.g., a silicone hard coat), polyurethanes (e.g., polyurethane acrylate), acrylics, polyacrylate (e.g., polymethacrylate, polymethyl methacrylate), polyvinylidene fluoride, polyesters, epoxies, and combinations comprising at least one of the foregoing. The weathering layer 104 can include ultraviolet absorbing molecules (e.g., such as hydroxyphenylthazine, hydroxybenzophenones, hydroxylphenylbenzothazoles, hydroxyphenyltriazines, polyaroylresorcinols, and cyanoacrylate, as well as combinations comprising at least one of the foregoing). For example, the weathering layer can comprise a silicone hard coat layer (AS4000 or AS4700, commercially available from Momentive Performance Materials).

The weathering layer can comprise a primer layer and a coating (e.g., a top coat). A primer layer can aid in adhesion of the weathering layer to the substrate. The primer layer can include, but is not limited to, acrylics, polyesters, epoxies, and combinations comprising at least one of the foregoing. The primer layer can also include ultraviolet absorbers in addition to or in place of those in the top coat of the weathering layer. For example, the primer layer can comprise an acrylic primer (SHP401 or SHP470, commercially available from Momentive Performance Materials).

The abrasion resistant layer (e.g., a coating, or plasma coating) can comprise a single layer or a multitude of layers and can add enhanced functionality by improving abrasion resistance of the glazing. Generally, the abrasion resistant layer can comprise an organic coating and/or an inorganic coating such as, but not limited to, aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxynitride, silicon carbide, silicon oxy carbide, hydrogenated silicon oxy-carbide, tantalum oxide, titanium oxide, tin oxide, indium tin oxide, yttrium oxide, zinc oxide, zinc selenide, zinc sulfide, zirconium oxide, zirconium titanate, glass, and combinations comprising at least one of the foregoing.

The abrasion resistant layer can be applied by various deposition techniques such as vacuum assisted deposition processes and atmospheric coating processes. For example, vacuum assisted deposition processes can include, but are not limited to, plasma enhanced chemical vapor deposition (PECVD), arc-PECVD, expanding thermal plasma PECVD, ion assisted plasma deposition, magnetron sputtering, electron beam evaporation, and ion beam sputtering.

Optionally, one or more of the layers (e.g., weathering layer and/or abrasion resistant layer) can be a film applied to the substrate by a method such as lamination or film insert molding. In this case, the functional layer(s) or coating(s) could be applied to the film and/or to the side of the substrate opposite the side with the film. For example, a co-extruded film, an extrusion coated, a roller-coated, or an extrusion-laminated film comprising greater than one layer can be used as an alternative to a hard coat (e.g., a silicone hard coat) as previously described. The film can contain an additive or copolymer to promote adhesion of the weathering layer (i.e., the film) to an abrasion resistant layer, and/or can itself comprise a weatherable material such as an acrylic (e.g., polymethylmethacrylates), fluoropolymer (e.g., polyvinylidene fluoride, polyvinyl fluoride), etc., and/or can block transmission of ultraviolet radiation sufficiently to protect the underlying substrate; and/or can be suitable for film insert molding (FIM) (in-mold decoration (IMD)), extrusion, or lamination processing of a three dimensional shaped panel.

Various additives can be added to the various layers of the glazing such as colorant(s), antioxidant(s), surfactant(s), plasticizer(s), infrared radiation absorber(s), antistat(s), antibacterial(s), flow additive(s), dispersant(s), compatibilizer(s), cure catalyst(s), ultraviolet radiation absorber(s), and combinations comprising at least one of the foregoing. The type and amounts of any additives added to the various layers depends on the desired performance and end use of the glazing.

A polycarbonate sub-layer (e.g., cap layer) can be co-extruded with, or extrusion laminated to, a weathering film or another functional layer, as a carrier sub-layer. This polycarbonate carrier sub-layer, which can be transparent, can assist in supporting the formation and structure of the weathering layer or other function layer, as well as optionally providing for melt bonding of the carrier sub-layer to a substrate during film insert molding. The carrier sub-layer can accommodate a mismatch in coefficient of thermal expansion (CTE) between the substrate and the weathering film or other functional layer. The polycarbonate used as the carrier sub-layer can support the inclusion of additional functionality, such as a printed black-out/fade-out or defroster and the like, and/or a graphics film and the like.

The tool disclosed comprising a shut off system with a shut off pin located opposite the film gate and nozzle can effectively prevent the backflow of material into an injection mold cavity. As disclosed herein, the shut off pin can be located opposite the gate region in the injection mold, and can prevent backflow of material into the runner system of the injection mold. Such a location for the shut off pin (i.e., opposite the gating in an injection mold) can help solve the problems associated with undesirably high shrinkage in the gate region of the shaped part. A shut off pin located opposite the gating can also provide greater clarity injection molded parts. The shut off system disclosed herein wherein the shut off pin is located opposite the gate region, can prevent backflow of material into the runner system of the injection mold.

Set forth below are some examples of the tool and method disclosed herein and articles made thereby.

Embodiment 1

A tool, comprising: a tool stationary portion comprising a nozzle and a film gate; and a tool movable portion comprising a shut off pin opposite the nozzle and the film gate; wherein the shut off pin prevents polymer melt in the nozzle from leaking into a cavity of the tool after injection of polymer into the tool.

Embodiment 2

A tool, comprising: a tool stationary portion comprising a nozzle through which polymer melt flows laminarly; and a tool movable portion comprising a shut off pin; wherein the tool stationary portion and the tool movable portion form a cavity therein when the tool is closed; wherein the shut off pin is configured to seal the polymer melt in the nozzle after injection of polymer melt into the cavity Embodiment 3

A tool comprising: a tool first portion comprising a nozzle and a film gate; and a tool second portion comprising a shut off pin opposite the nozzle and the film gate; wherein the tool first portion and/or the tool second portion is movable to close the mold and form the mold cavity and so that the an injected polymer can be compressed between the first mold portion and the second mold portion; wherein the shut off pin is movable to prevents polymer melt in the nozzle from leaking into a cavity of the tool after injection of polymer into the tool.

Embodiment 4

A tool, comprising: a tool first portion comprising a nozzle through which polymer melt flows laminarly; and a tool second portion comprising a shut off pin; wherein the tool first portion and the tool second portion form a cavity when the tool is closed; and wherein the shut off pin is configured to move to block the nozzle after injection of polymer melt into the cavity.

Embodiment 5

The tool of any of claims 1-4, wherein the shut off pin extends from an ejector plate in the tool second portion, and has a size that will prevent polymer melt from passing through the nozzle when the shut off pin is in physical contact with the nozzle.

Embodiment 6

The tool of any of claims 1-5, wherein the shut off pin further comprises a ledge protruding from an end of the shut off pin closest to the nozzle.

Embodiment 7

The tool of any of claims 1-6, wherein the shut off pin is taperless.

Embodiment 8

The tool of any of claims 1-7, wherein tool first portion comprises an annular section between the nozzle and the cavity, wherein the annular section has a larger diameter than the nozzle.

Embodiment 9

The tool of any of claims 1-8, wherein the film gate comprises a sloped section configured such that a cold slug will move opposite a part direction in a cold runner.

Embodiment 10

The tool of any of claims 1-9, wherein the shut off valve has a ledge comprising an undercut that can pull a cold slug out of the nozzle.

Embodiment 11

The tool of any of claims 1-10, wherein the first mold portion is free of a shut off pin.

Embodiment 12

The tool of any of claims 1-11, wherein the shut off pin comprises a generally rectangular cross section extending from an ejector plate in the tool.

Embodiment 13

The tool of any of claims 1-12, wherein the nozzle comprises an annular section, wherein the annular section moves when the mold opens or closes.

Embodiment 14

A method of making a shaped part, comprising: closing a tool comprising a tool first portion comprising a nozzle and a film gate and a tool second portion comprising a shut off pin opposite the nozzle; injecting polymer melt into a cavity of the tool, wherein the polymer melt flows through the nozzle; blocking the nozzle by moving the shut off pin in the direction of the nozzle; completing a compression stroke; releasing the shut off pin; pushing the shut off pin in the opposite direction of the nozzle; opening the tool; and ejecting the shaped part.

Embodiment 15

A method of making a shaped part, comprising: closing a tool comprising a tool first portion comprising a nozzle and a film gate and a tool second portion comprising a shut off pin opposite the nozzle; injecting polymer melt into a cavity of the tool, wherein the polymer melt flows through the nozzle; blocking the nozzle with the shut off pin; compressing the polymer melt; releasing the shut off pin; opening the tool; and removing the shaped part.

Embodiment 16

The method of any of claims 14-15, further comprising removing a slug of material from the nozzle with the shut off pin.

Embodiment 17

The method of any of claims 14-16, wherein when polymer melt is flowing through the nozzle, the flow is laminar.

Embodiment 18

The method of any of claims 14-17, wherein closing the tool comprises creating relative motion between the first mold portion and the second mold portion.

Embodiment 19

The method of any of claims 14-18, wherein a slug moves away from a part direction in a cold runner.

Embodiment 20

An article formed by the method of any of claims 14-19.

Embodiment 21

An article formed by the tool of any of claims 1-13.

Embodiment 22

The article of any of Embodiments 20-21, wherein the article comprises glazing, appliques, headlamps, and outdoor applications.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. "Or" means "and/or" unless the context specifies otherwise.

All cited patents, patent applications, and other references are incorporated herein by reference in their entirety. However, if a term in the present application contradicts or conflicts with a term in the incorporated reference, the term from the present application takes precedence over the conflicting term from the incorporated reference While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method of making a shaped part, comprising:
closing a tool comprising a first portion comprising a nozzle and a second portion comprising a shut off pin opposite the nozzle, and a film gate and a mold cavity formed between the first portion and the second portion;
injecting polymer melt into the mold cavity of the tool, wherein the polymer melt flows through the nozzle and through the film gate;
blocking the nozzle by direct contact with the shut off pin;
completing a compression stroke wherein the mold cavity is compressed, a thickness of the film gate is decreased, and the shut off pin moves;
releasing the shut off pin;
pushing the shut off pin in the opposite direction of the nozzle;
opening the tool;
ejecting the shaped part; and
pulling leftover material from the nozzle with the shut off pin.

2. The method of claim 1, further comprising removing a slug of material from the nozzle with the shut off pin.

3. The method of claim 1, wherein when polymer melt is flowing through the nozzle, the flow is laminar.

4. The method of claim 1, wherein closing the tool comprises creating relative motion between the first portion and the second portion.

5. The method of claim 1, wherein a slug moves away from the mold cavity into the film gate.

6. A method of making a shaped part, comprising:
closing a tool comprising a first portion comprising a nozzle and a second portion comprising a shut off pin opposite the nozzle, and a film gate and a mold cavity formed between the first portion and the second portion;
injecting polymer melt into the mold cavity of the tool, wherein the polymer melt flows through the nozzle and through the film gate;
blocking the nozzle by direct contact with the shut off pin;
completing a compression stroke wherein the mold cavity is compressed, a thickness of the film gate is decreased, and the shut off pin moves;
opening the tool; and
ejecting the shaped part.

7. A tool, comprising:
a first portion comprising a nozzle; and
a second portion comprising a shut off pin opposite the nozzle;
a film gate between the first portion and the second portion, wherein the film gate has an injection thickness;
wherein the first portion and/or the second portion is movable to close and form a mold cavity so that an injected polymer can be compressed between the first portion and the second portion;
wherein the shut off pin is movable to directly contact the nozzle and prevent polymer melt in the nozzle from leaking into the cavity of the tool after injection of polymer into the tool; and
wherein the tool is configured such that the compression both decreases a film gate thickness from the injection thickness to a compression thickness, moves the shut off pin, and forms the mold cavity.

8. The tool of claim 7, wherein the shut off pin extends from an ejector plate in the second portion, and has a size that will prevent polymer melt from passing through the nozzle when the shut off pin is in physical contact with the nozzle.

9. The tool of claim 8, wherein the shut off pin further comprises a ledge protruding from an end of the shut off pin closest to the nozzle.

10. The tool of claim 7, wherein the shut off pin is taperless.

11. The tool of claim 7, wherein first portion comprises an annular section between the nozzle and the cavity, wherein the annular section has a larger diameter than the nozzle.

12. The tool of claim 7, wherein the film gate comprises a sloped section configured such that during operation, a cold slug will move into the film gate and away from the mold cavity.

13. The tool of claim 7, wherein the shut off pin has a ledge comprising an undercut that can pull a cold slug out of the nozzle.

14. The tool of claim 7, wherein the first portion is free of a shut off pin.

15. A tool, comprising:
a first portion comprising a nozzle through which polymer melt flows laminarly;
a second portion comprising a shut off pin; and
a film gate between the first portion and the second portion, wherein the film gate has an injection thickness;
wherein the first portion and the second portion form a mold cavity when the tool is closed;
wherein the shut off pin is configured to move to directly contact and block the nozzle after injection of polymer melt into the cavity; and
wherein the shut off pin is configured to move to allow compression of the film gate and the mold cavity after injection of the polymer melt.

* * * * *